(12) United States Patent
Hoversten et al.

(10) Patent No.: US 10,310,127 B2
(45) Date of Patent: Jun. 4, 2019

(54) SYSTEM AND METHOD OF DETECTING WELL INTEGRITY FAILURE

(71) Applicant: Chevron U.S.A. Inc., San Ramon, CA (US)

(72) Inventors: Gary Michael Hoversten, San Ramon, CA (US); Thomas M. Daley, Oakland, CA (US); Valeri A. Korneev, Benicia, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 14/924,821

(22) Filed: Oct. 28, 2015

(65) Prior Publication Data

US 2016/0116621 A1  Apr. 28, 2016

Related U.S. Application Data

(60) Provisional application No. 62/069,372, filed on Oct. 28, 2014.

(51) Int. Cl.
| | |
|---|---|
| *G01V 1/40* | (2006.01) |
| *G01V 1/52* | (2006.01) |
| *E21B 47/00* | (2012.01) |

(52) U.S. Cl.
CPC .............. *G01V 1/40* (2013.01); *E21B 47/00* (2013.01); *G01V 1/52* (2013.01)

(58) Field of Classification Search
CPC ............. G01V 1/40; G01V 1/52; E21B 47/00

USPC ..................................................... 367/25, 35
See application file for complete search history.

(56) References Cited

U.S. PATENT DOCUMENTS

| 4,853,901 A * | 8/1989 | Barber ................. E21B 47/042 |
| | | 367/27 |
| 2010/0206078 A1 | 8/2010 | Cheon et al. |

FOREIGN PATENT DOCUMENTS

WO    WO2014/164944 A1    9/2014

OTHER PUBLICATIONS

"Autocorrelation," Wikipedia, 2017, downloaded Dec. 1, 2017, 10 pages.*
De Ridder, S., Ambient seismic noise correlations for reservoir monitoring, 2012 SEG Las Vegas 2012 Annual Meeting.
PCT International Search Report and Written Opinion and Search Strategy, International App. No. PCT/US2015/057830 dated May 6, 2016.

* cited by examiner

*Primary Examiner* — Daniel L Murphy
(74) *Attorney, Agent, or Firm* — Marie L. Clapp

(57) ABSTRACT

Embodiments of a method for detecting well integrity failure are disclosed herein. In general, embodiments of the method utilize seismic signals for detection. In particular, embodiments of the method may use recording of passive or active seismic signals. Further details and advantages of various embodiments of the method are described in more detail in the application.

8 Claims, 8 Drawing Sheets

WELL A $t_T = 0.65s$ , $t_B = 0.83s$

SYSTEM AND METHOD OF DETECTING WELL INTEGRITY FAILURE

CROSS-REFERENCE TO RELATED APPLICATIONS

The present application claims priority from U.S. Provisional Patent Application No. 62/069,372, filed Oct. 28, 2014, the complete disclosure of which is incorporated herein by reference in its entirety for all purposes.

STATEMENT REGARDING FEDERALLY SPONSORED RESEARCH OR DEVELOPMENT

Not applicable

BACKGROUND

Field of the Invention

This invention relates generally to the field of exploration and production for hydrocarbons. More specifically, the invention relates to a method of using active or passive seismic signals transmitted along a well casing to determine the structural integrity of the well casing.

Background of the Invention

A well for producing hydrocarbons generally includes a casing cemented to the wellbore which penetrates the formation and one or more injection or production tubes within the casing. Occasionally, an open bore hole, i.e., one without a casing, contains the injection or production tubing strings therein. The well may often penetrate numerous production or injection zones of interest. Casing or tubing impairment or damage may lead to loss of pressure integrity, pinching of production tubing, or an inability to lower tools into the well. Damage or impairment to the casing and/or tubing may occur through shear owing to displacement of the rock strata along bedding planes or along more steeply inclined fault planes, also known as shear failures. These failures may be triggered by stress concentrations generated by changes in volume resulting from production or injection activity from a hydrocarbon producing reservoir. The volume changes may come about from pressure changes, temperature changes, or solids movement (solids/liquids injection or production).

There are various mechanisms for casing damage which are recognized, including compression, tension, corrosion and shear. Compressional failures may occur within a producing interval due to large vertical strains associated with compaction. Tensile failures can result when material outside of the compacting zone provides vertical support to material above the compacting zone. Thermal expansion due to steam injection may also contribute to development of tensile stresses in an overburden. Corrosion can occur because of a presence of chemically active fluids in rock. Shear failures may also be induced by horizontal displacements along weak bedding planes or reactivated faults in the overburden above a reservoir. Once well shear or well damage is detected, appropriate corrective actions may be taken to avoid and prevent any incidents from occurring. Consequently, there is a need for methods and systems for detecting well shear failures.

BRIEF SUMMARY

Embodiments of a method for detecting well integrity failure are disclosed herein. In general, embodiments of the method utilize seismic signals for detection. In particular, embodiments of the method may use recording of passive or active seismic signals. Further details and advantages of various embodiments of the method are described in more detail below.

In an embodiment, a system for detecting well shear failure, the system comprises a source of seismic energy located proximate to a wellbore and a seismic sensor disposed proximate a wellhead of a wellbore. The seismic sensor is configured to record a plurality of measured seismic signals from the wellbore. The system also comprises computer system coupled to the seismic sensor and is configured to detect well integrity failure as determined from the plurality of seismic signals. The computer system is configured to compare the measured seismic signals to a plurality of seismic signals recorded from an undamaged well.

In another embodiment, method of detecting well integrity failure comprises: (a) recording a plurality of seismic signals from a wellbore using a seismic sensor disposed proximate the wellbore and (b) autocorrelating the seismic signals to detect well integrity failure.

In yet another embodiment, a method of detecting well integrity failure comprises: (a) generating a plurality of seismic signals from a plurality of wellbores using a seismic source configured to produce a seismic signal from each wellbore, wherein at least one of the wellbores comprises a damaged wellbore which has been shut in due to a well integrity failure. The method also comprises (b) recording the seismic signals from the wellbores using one or more seismic sensors disposed proximate the wellbores and (c) comparing the seismic signals from the damaged wellbore to the other undamaged wellbores to detect well integrity failure.

In yet another embodiment, a method of detecting well integrity failure comprises: (a) generating a plurality of seismic signals at a wellbore using a seismic source configured to produce one or more measured seismic signals from the wellbore. The method also comprises (b) creating, using a computer, a numerically modeled seismic response of an undamaged and a damaged well as measured from another wellbore and (c) comparing, using the computer, the measured seismic signals with the numerically modeled seismic response to determine if the wellbore is damaged or not.

The foregoing has outlined rather broadly the features and technical advantages of the invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the invention. It should also be realized by those skilled in the art that such equivalent constructions do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. This document does not intend to distinguish between components that differ in name but not function.

As used herein, "well integrity failure" may refer to damage, breach or failure to the integrity of a well including, without limitation, well casing and/or tubing for any reason.

In the following discussion and in the claims, the terms "including" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection, or through an indirect connection via other devices and connections.

DETAILED DESCRIPTION OF THE PREFERRED EMBODIMENTS

Referring now to the Figures, embodiments of the disclosed methods will be described. As a threshold matter, embodiments of the methods may be implemented in numerous ways, as will be described in more detail below, including for example as a system (including a computer processing system), a method (including a computer implemented method), an apparatus, a computer readable medium, a computer program product, a graphical user interface, a web portal, or a data structure tangibly fixed in a computer readable memory. Several embodiments of the disclosed methods are discussed below. The appended drawings illustrate only typical embodiments of the disclosed methods and therefore are not to be considered limiting of its scope and breadth.

Figure 1A:
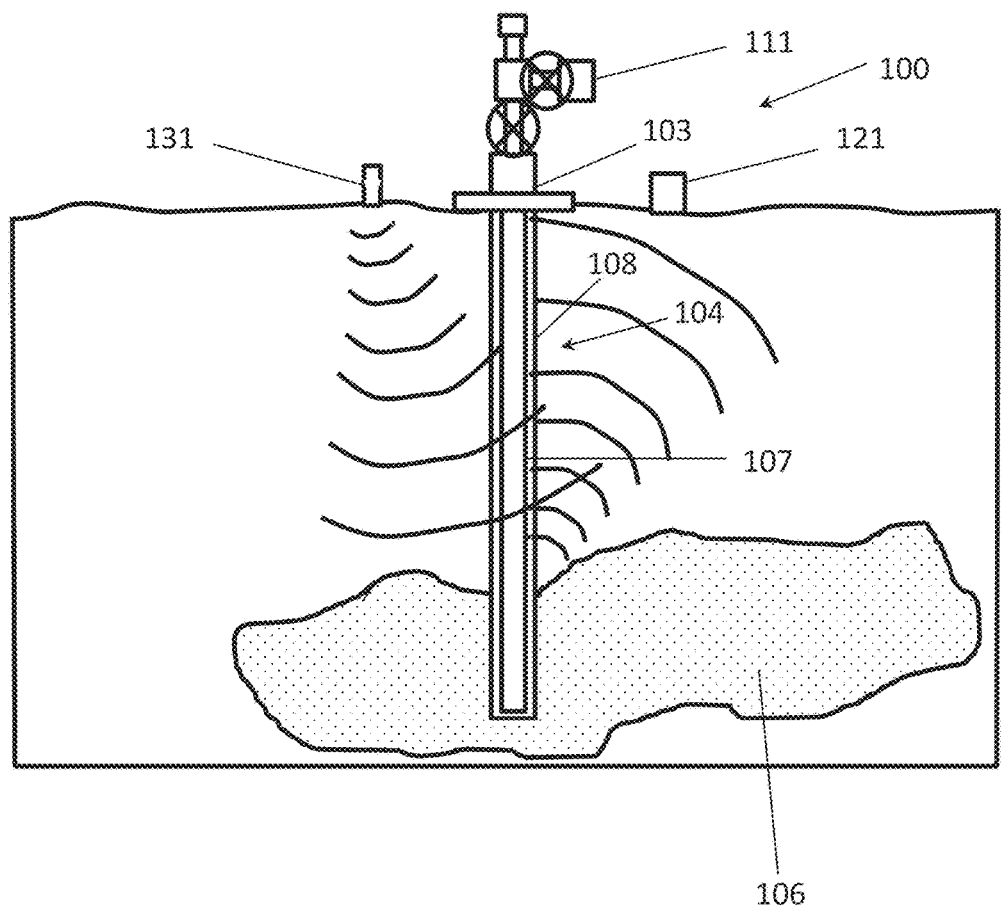
FIG. 1A illustrates a schematic representation of an embodiment of the disclosed system and method as used with a wellbore disposed within a hydrocarbon reservoir.

FIG. 1 illustrates an embodiment of apparatus 100 for sensing or detecting well integrity failure in a wellbore or borehole 104. In the illustrated example, the wellbore 104 extends through a subterranean or subsurface hydrocarbon producing formation 106 disposed beneath the surface of the earth. Though the borehole 104 is illustrated as a straight, vertical bore, in practice the borehole 104 can have a more complex geometry (e.g. horizontal drilling) and can have any orientation, including varying orientation along its length.

The borehole 104 can be lined with a hollow casing 108 made up of a number of segments. The hollow borehole casing 108 can, for example, be configured of steel or other suitable material. In a typical drilling application, the borehole casing 108 may be a standard casing used to provide structural support to the borehole in ordinary drilling and production applications and it is not necessary to provide any additional outer conductive medium. To extract hydrocarbons from the formation 106, production tubing 107 is disposed annularly within the casing 108. The wellbore 104 may be topped with a tree 111 at the wellhead 102. Other downhole tools and devices, as are known in the art, may be included or used in conjunction with embodiments of the disclosed systems and methods.

In an embodiment, a seismic sensor 121 can be placed on the well head or in close proximity to the well head 103. However, the seismic sensor 121 may be placed in any location suitable or sufficient such that it can sense or detect signals transmitted along the wellbore and reflected from the wellbore 108. The seismic sensor 121 may be any recording device known to those of skill in the art capable of recording and/or detecting seismic signal. Examples include without limitation, geophones, hydrophones, ocean bottom sensors, and the like. In one aspect, the seismic sensor 121 may passively record seismic data from the well, without the use of a seismic source. In the passive mode the background noise can be recorded for a period of time. This period of time may range from hours to days. In particular, the period of time may range from about 30 minutes to about 30 days, alternatively from 6 hours to about 2 weeks, alternatively from about 24 hours to about 72 hours. The recorded data can then be processed by methods known to those of skill in the art. Examples of processing may include without limitation, deconvolution, filtering, etc. In an embodiment, the measuring, processing, and analysis of data may occur in real time.

In one embodiment, the recorded data may be analyzed via autocorrelation to determine whether well integrity failure has occurred. Autocorrelation of long seismic noise records is known as a type of seismic interferometry which converts the recorded data to a form generated by an active pulse source. One example would be a comparison of the power spectrum of the autocorrelation function for intact or undamaged well versus damaged or compromised wells, where a distinct change in the character of the power spectrum could occur. A second example would be that the travel time of the peak in the autocorrelation function would change between an intact well and a damaged or compromised well. It is noted that although well integrity failure has been mentioned, any mechanism of casing impairment may be detected using the disclosed methods.

Although seismic interferometry has been used for reservoir monitoring, the method used for reservoir monitoring is substantially different from the present embodiment. First, reservoir monitoring requires at least two seismic sensors placed at a distance from each other (generally tens to hundreds of meters apart) that need not be proximate to any wellheads. Second, the seismic signals recorded at the plurality of seismic sensors are cross-correlated rather than autocorrelated. Finally, the method used for reservoir monitoring is by its design intended to provide information about a subsurface volume (i.e. the reservoir in 2 or 3 dimensions) while the present embodiment is designed to provide a 1D answer about the well integrity. The seismic interferometry method used for reservoir monitoring is incapable of the resolution needed to identify a damaged or compromised well; likewise, the present embodiment would be incapable of providing information about a subsurface volume.

In another aspect, a seismic source 131 (e.g. a vibrator or sledge hammer) can be applied to the well casing or to the ground in the nearby vicinity of the well in question. In another embodiment, a seismic source 131 may be placed near or at the well head, where the seismic source is configured to generate a periodic or continuous signal and the seismic sensor 121 may constantly record for a period of time as discussed above. In an embodiment where the seismic sensor 121 is configured for periodic generation of signals, the seismic sensor 121 can be configured to generate intermittent signals over a specified period of time. For example, without limitation, the seismic sensor 121 could generate a seismic signal once every 10 minutes for three months at a time. Any suitable period of time may be used and the seismic signal may be generated at any frequency (e.g. once per hour, 4 times per hour, etc.). The seismic source 121 may be a continuous source or an impulsive source (e.g. vibrator). The excited seismic wave field can then be recorded with a seismic sensor or detector 121.

Figure 1B:
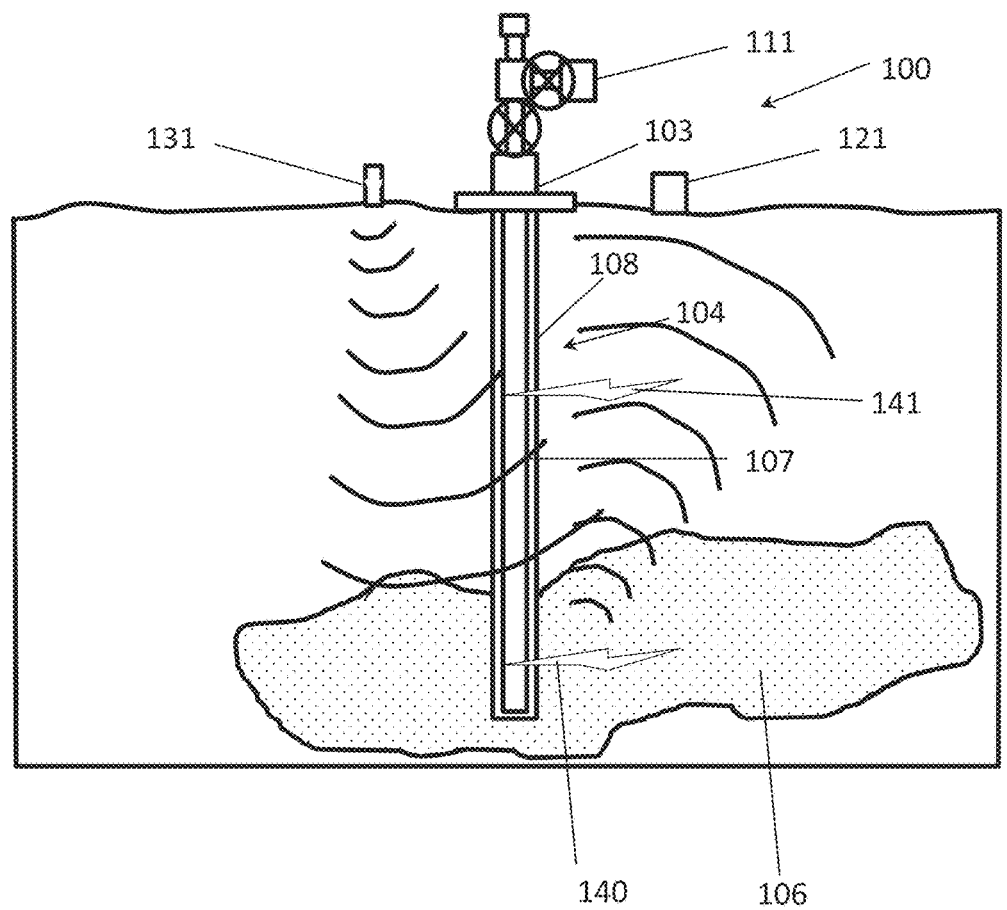
FIG. 1B illustrates another schematic representation of an embodiment of the disclosed system and method as used with a failed wellbore disposed above or within a hydrocarbon reservoir.

For any given well or field this procedure can be performed for every well in the field to develop a database of the records. The seismic data acquisition is performed also for de-commissioned or defunct wells which have already failed as shown in FIG. 1B which shows a well with well integrity failure 140 or 141. The differences in the records between failed (e.g. via integrity failure or other well failure) and intact wells can be used to indicate if a well in question has failed. That is, the seismic datasets from each well may be compared to determine some characteristic seismic pattern for wells with a well integrity failure. The seismic pattern may then be used as a predictor of well integrity failure in other wells as discussed below.

Figure 2:
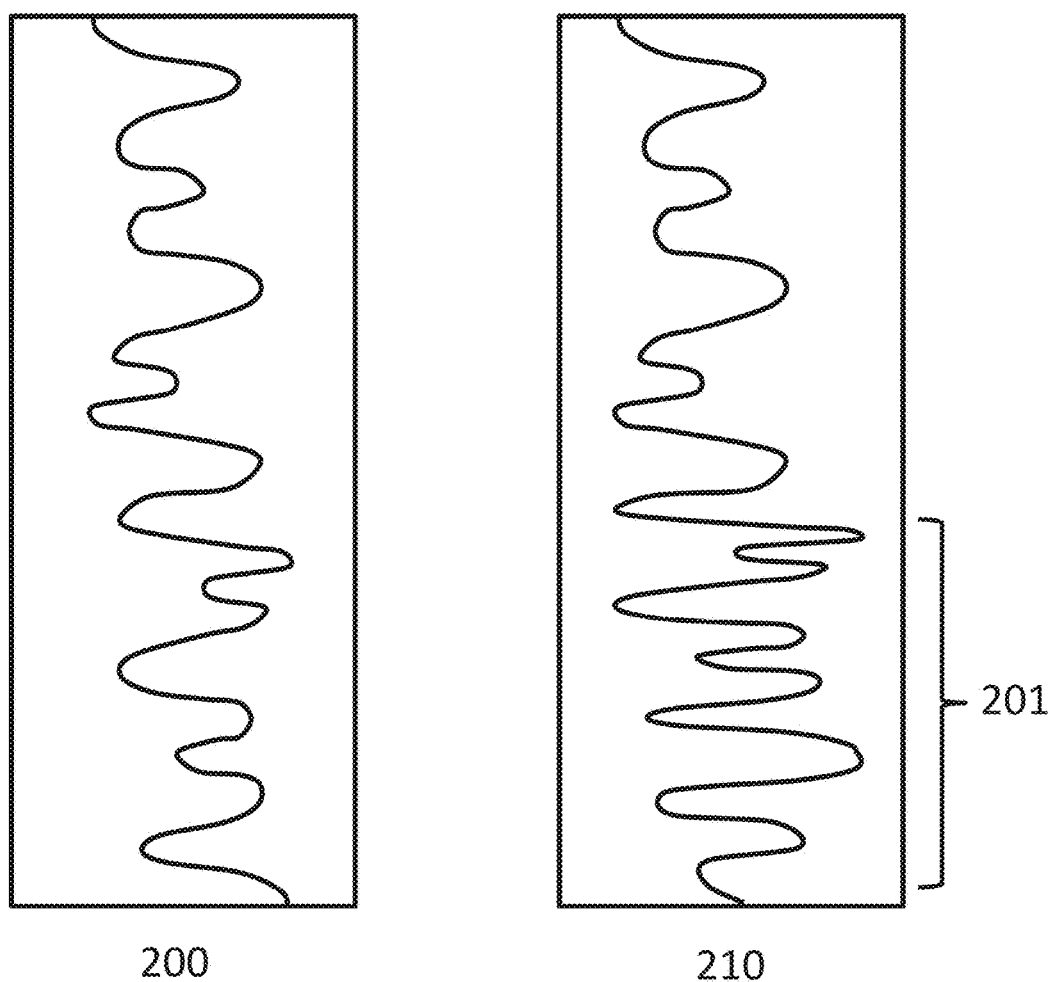
FIG. 2 illustrates a hypothetical comparison of seismic signals from an intact well to a failed well.

Accordingly, in a further embodiment, refinements can be made to the predictions by the addition of numerical modeling of the wells in the failed and un-failed states and comparison of the numerical model results to the measured field results. For example, the well completion information (changes in casing diameter, locations of packers, perforated zones) is known rather accurately, which allows the computation of all related seismic waves and their arrival times. The appearance of additional unpredicted waves during repeat surveys after the baseline survey is an indicator of the presence of damaged zones. FIG. 2 shows a cartoon of comparing the hypothetical seismic signals from an intact well 200 to a failed well 210 for illustrative purposes only. Here the time dependent records are converted into depth dependent functions using knowledge about wave propagation velocities. Comparison with the baseline measurements allows to detect the depth intervals where correlation (and/or difference) between the data sharply changes compare to other intervals. These intervals indicate damaged zones. Without being limited by theory, a difference in the seismic signal as shown by bracket 201 is indicative of well integrity failure.

Those skilled in the art will appreciate that the disclosed methods may be practiced using any one or combination of hardware and software configurations, including but not limited to a system having single and/or multi-processer computer processors system, hand-held devices, programmable consumer electronics, mini-computers, mainframe computers, supercomputers, and the like. The disclosed methods may also be practiced in distributed computing environments where tasks are performed by servers or other processing devices that are linked through one or more data communications networks. In a distributed computing environment, program modules may be located in both local and remote computer storage media including memory storage devices.

Figure 3:
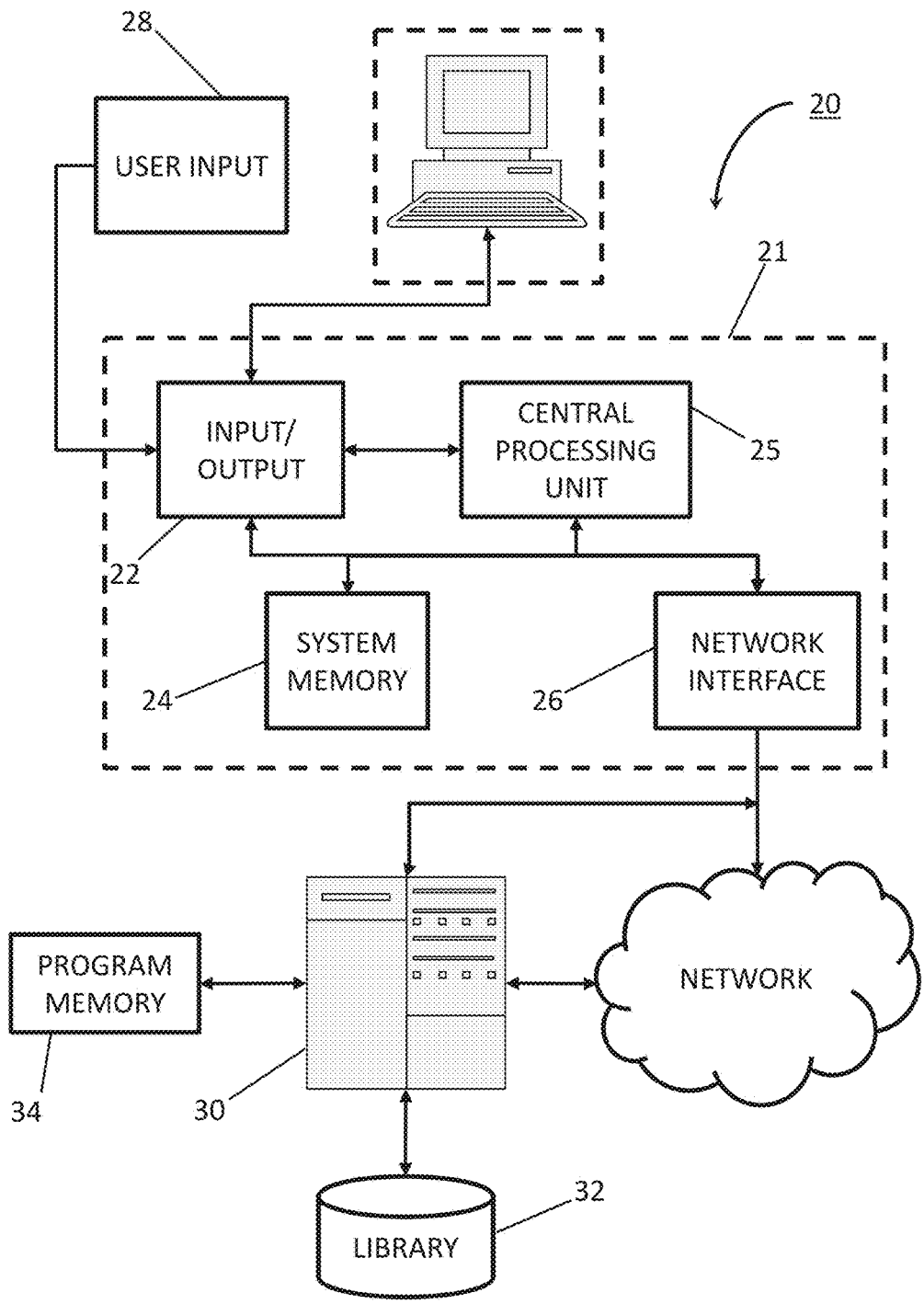
FIG. 3 illustrates a schematic of a system which may be used in conjunction with embodiments of the disclosed methods.

FIG. 3 illustrates, according to an example embodiment of an allocation system 20, which may be used to analyze the data acquired using embodiments of the disclosed systems and methods. In this example, system 20 is as realized by way of a computer system including workstation 21 connected to server 30 by way of a network. Of course, the particular architecture and construction of a computer system useful in connection with this invention can vary widely. For example, system 20 may be realized by a single physical computer, such as a conventional workstation or personal computer, or alternatively by a computer system implemented in a distributed manner over multiple physical computers. Accordingly, the generalized architecture illustrated in FIG. 3 is provided merely by way of example.

As shown in FIG. 3 and as mentioned above, system 20 may include workstation 21 and server 30. Workstation 21 includes central processing unit 25, coupled to system bus. Also coupled to system bus is input/output interface 22, which refers to those interface resources by way of which peripheral functions P (e.g., keyboard, mouse, display, etc.) interface with the other constituents of workstation 21. Central processing unit 25 refers to the data processing capability of workstation 21, and as such may be implemented by one or more CPU cores, co-processing circuitry, and the like. The particular construction and capability of central processing unit 25 is selected according to the application needs of workstation 21, such needs including, at a minimum, the carrying out of the functions described in this specification, and also including such other functions as may be executed by computer system. In the architecture of allocation system 20 according to this example, system memory 24 is coupled to system bus, and provides memory resources of the desired type useful as data memory for storing input data and the results of processing executed by central processing unit 25, as well as program memory for storing the computer instructions to be executed by central processing unit 25 in carrying out those functions. Of course, this memory arrangement is only an example, it being understood that system memory 24 may implement such data memory and program memory in separate physical memory resources, or distributed in whole or in part outside of workstation 21. In addition, as shown in FIG. 3, seismic data inputs 28 that are acquired from a seismic survey are input via input/output function 22, and stored in a memory resource accessible to workstation 21, either locally or via network interface 26.

Network interface 26 of workstation 21 is a conventional interface or adapter by way of which workstation 21 accesses network resources on a network. As shown in FIG. 3, the network resources to which workstation 21 has access via network interface 26 includes server 30, which resides on a local area network, or a wide-area network such as an intranet, a virtual private network, or over the Internet, and which is accessible to workstation 21 by way of one of those network arrangements and by corresponding wired or wireless (or both) communication facilities. In this embodiment of the invention, server 30 is a computer system, of a conventional architecture similar, in a general sense, to that of workstation 21, and as such includes one or more central processing units, system buses, and memory resources, network interface functions, and the like. According to this embodiment of the invention, server 30 is coupled to program memory 34, which is a computer-readable medium that stores executable computer program instructions, according to which the operations described in this specification are carried out by allocation system 20. In this embodiment of the invention, these computer program instructions are executed by server 30, for example in the form of a "web-based" application, upon input data communicated from workstation 21, to create output data and results that are communicated to workstation 21 for display or output by peripherals P in a form useful to the human user of workstation 21. In addition, library 32 is also available to server 30 (and perhaps workstation 21 over the local area or wide area network), and stores such archival or reference information as may be useful in allocation system 20. Library 32 may reside on another local area network, or alternatively be accessible via the Internet or some other wide area network. It is contemplated that library 32 may also be accessible to other associated computers in the overall network.

The particular memory resource or location at which the measurements, library 32, and program memory 34 physically reside can be implemented in various locations accessible to allocation system 20. For example, these data and program instructions may be stored in local memory resources within workstation 21, within server 30, or in network-accessible memory resources to these functions. In addition, each of these data and program memory resources can itself be distributed among multiple locations. It is contemplated that those skilled in the art will be readily able to implement the storage and retrieval of the applicable measurements, models, and other information useful in connection with this embodiment of the invention, in a suitable manner for each particular application.

According to this embodiment, by way of example, system memory 24 and program memory 34 store computer instructions executable by central processing unit 25 and server 30, respectively, to carry out the disclosed operations described in this specification, for example, by way of autocorrelating the seismic signals to detect well integrity failure. These computer instructions may be in the form of one or more executable programs, or in the form of source code or higher-level code from which one or more executable programs are derived, assembled, interpreted or compiled. Any one of a number of computer languages or protocols may be used, depending on the manner in which the desired operations are to be carried out. For example, these computer instructions may be written in a conventional high level language, either as a conventional linear computer program or arranged for execution in an object-oriented manner. These instructions may also be embedded within a higher-level application. Such computer-executable instructions may include programs, routines, objects, components, data structures, and computer software technologies that can be used to perform particular tasks and process abstract data types. It will be appreciated that the scope and underlying principles of the disclosed methods are not limited to any particular computer software technology. For example, an executable web-based application can reside at program memory 34, accessible to server 30 and client computer systems such as workstation 21, receive inputs from the client system in the form of a spreadsheet, execute algorithms modules at a web server, and provide output to the client system in some convenient display or printed form. It is contemplated that those skilled in the art having reference to this description will be readily able to realize, without undue experimentation, this embodiment of the invention in a suitable manner for the desired installations. Alternatively, these computer-executable software instructions may be resident elsewhere on the local area network or wide area network, or downloadable from higher-level servers or locations, by way of encoded information on an electromagnetic carrier signal via some network interface or input/output device. The computer-executable software instructions may have originally been stored on a removable or other non-volatile computer-readable storage medium (e.g., a DVD disk, flash memory, or the like), or downloadable as encoded information on an electromagnetic carrier signal, in the form of a software package from which the computer-executable software instructions were installed by allocation system 20 in the conventional manner for software installation.

To further illustrate various illustrative embodiments of the disclosed methods, the following examples are provided.

Example

An embodiment of the disclosed methods was applied to healthy and damaged wells in a reservoir located in California. Healthy and damaged wells were measured and the measurements were analyzed for identifiable tube wave events and whether or not a difference could be detected between healthy and damaged wells.

6 Wells were tested at the well site. 10 channels of data were recorded using three types of sensors. The three sensors used were: a 3 C Geophone, a 3 C Accelerometer, and a 1 C Magneto-acoustic sensor. Two different acoustic sources were tested. The first acoustic source was merely a sledge hammer which was banged or knocked on either the well casing or a wooden plank next to the wellhead. The other acoustic source was a hand operated echo-meter. Each source was repeated 10 times.

Figure 4:
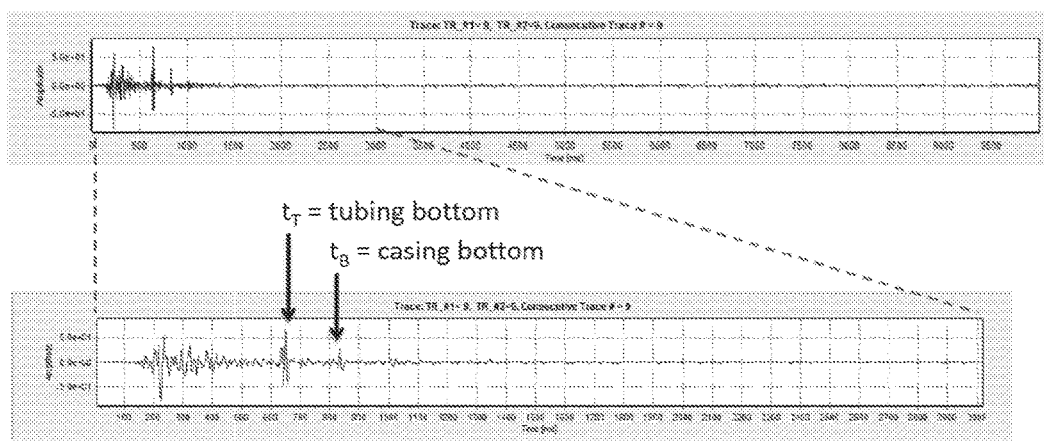
FIG. 4 illustrates results of a field test using an embodiment of the method on a healthy well.
Figure 5:
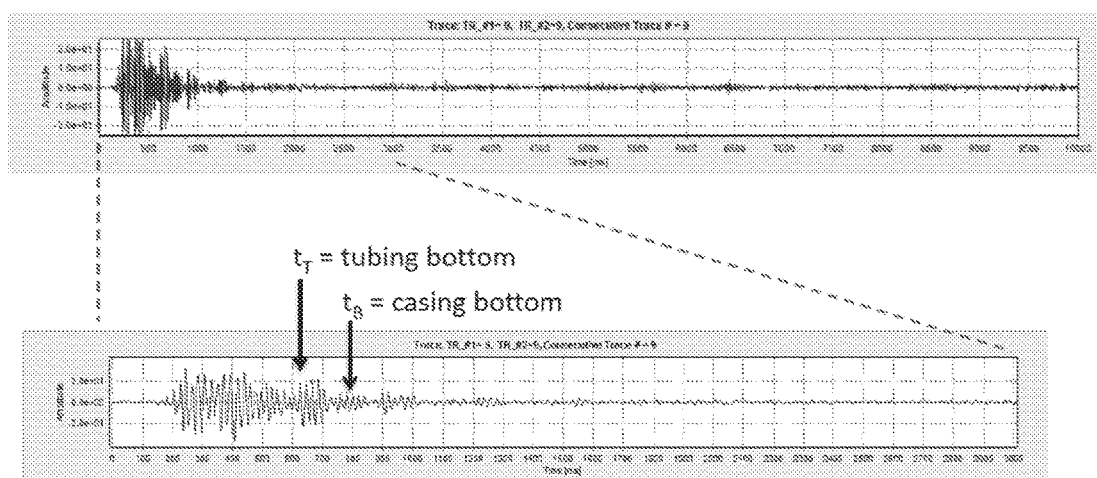
FIG. 5 illustrates results of a field test using an embodiment of the method on another healthy well.
Figure 6:
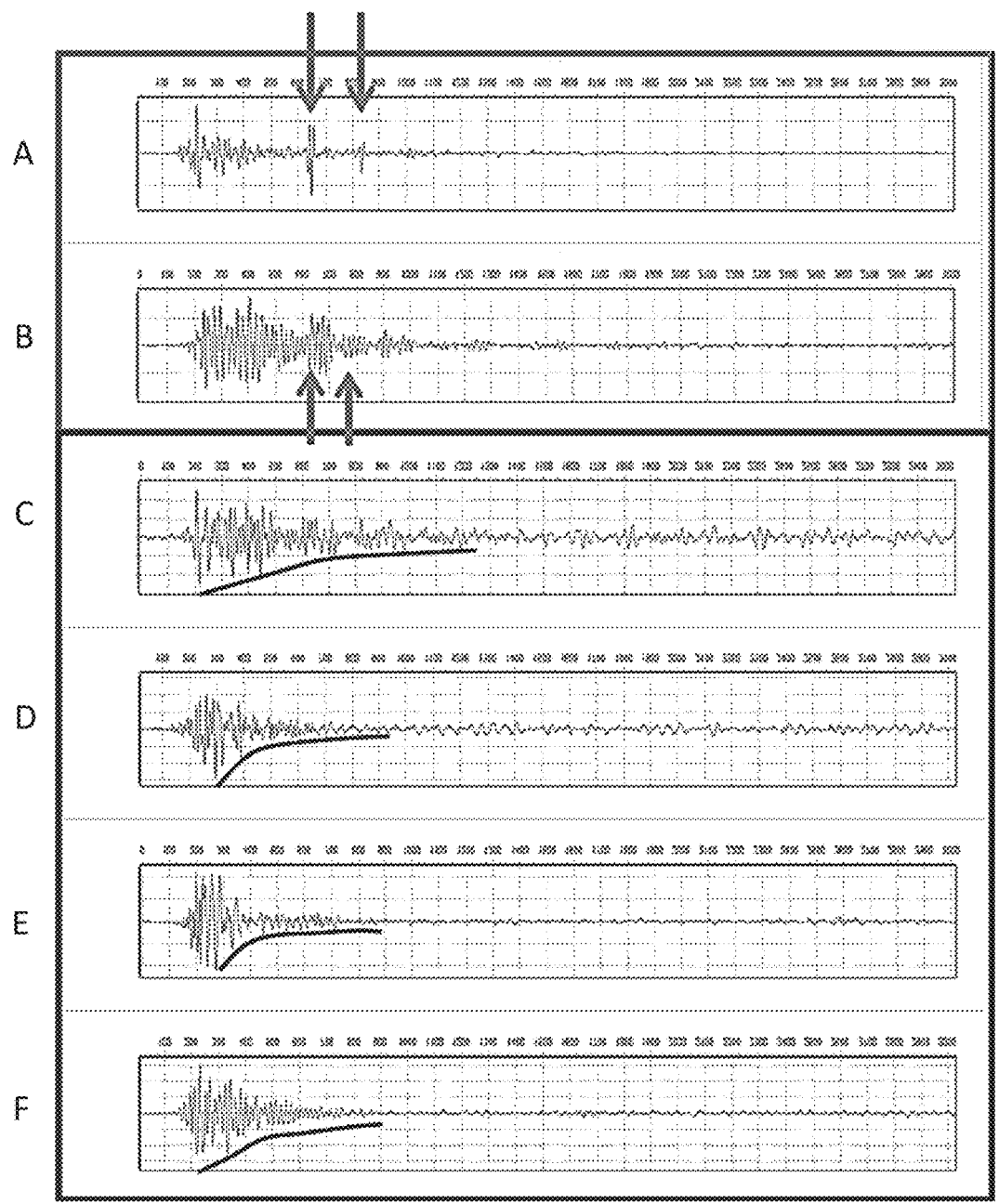
FIG. 6 illustrates results of a field test using an embodiment of the method on two health wells (A-B) and four damaged wells (C-F)
Figure 7:
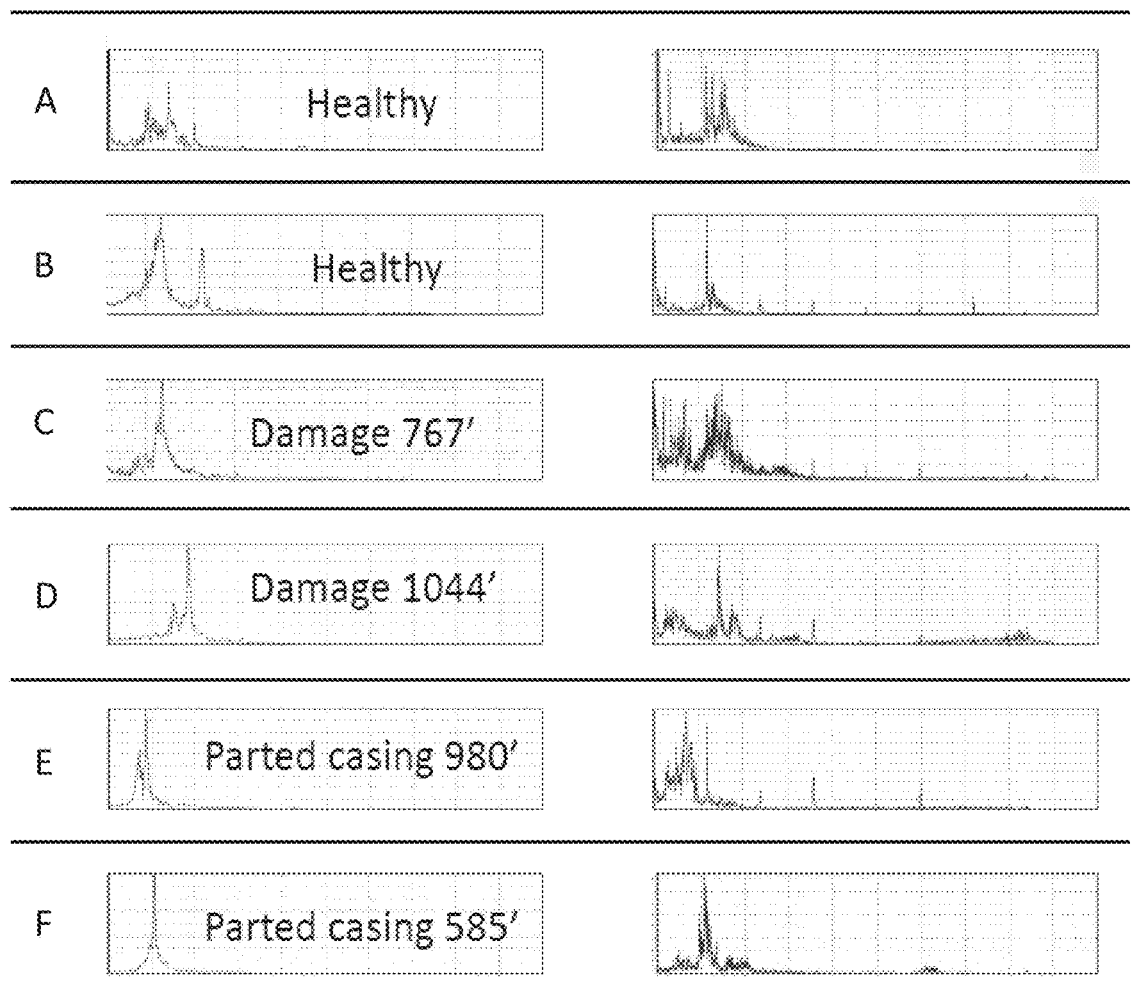
FIG. 7 illustrates spectral content results of a field test using an embodiment of the method on two health wells (A-B) and four damaged wells (C-F).

FIGS. 4-5 show the results of the tests from two of the healthy wells, labelled A and B, respectively. As used herein and in the Figures, $t_T$=reflection from the tubing end, $t_B$=reflection from the bottom, and $t_D$=reflection from any damage. FIG. 6 illustrates the measured amplitude from all the wells. The plots of the two healthy wells are shown labeled A and B, while the plots of the four damaged wells are shown labelled C through F. FIG. 7 shows the spectral content of all measured wells. Wells C through F were the damaged wells. A late coda was noted from 0.2 seconds to 2.2 seconds. Based on preliminary measurements, there were three independent indicators of damaged wells: 1) In time domain the healthy wells had distinctive multiple reflections from the bottom. Damaged wells reduced these reflections to the noise levels; 2) In the frequency domain, the late coda of damaged wells was unimodal; and 3) Ambient noise of damaged wells had increased energy at low frequencies.

Field results indicate that there is potential to determine well condition from non-invasive acoustic wellhead measurements. Baseline measurements of the healthy wells and periodic monitors may be used to determine depth and nature of damage from differential data. Furthermore, it was found that using the sledge hammer with a timing pulse allowed stacking and produces measurable events. Other seismic sources such as digital echo meters, vibrators can also be used.

While the embodiments of the invention have been shown and described, modifications thereof can be made by one skilled in the art without departing from the spirit and teachings of the invention. The embodiments described and the examples provided herein are exemplary only, and are not intended to be limiting. Many variations and modifications of the invention disclosed herein are possible and are within the scope of the invention. Accordingly, the scope of protection is not limited by the description set out above, but is only limited by the claims which follow, that scope including all equivalents of the subject matter of the claims.

The discussion of a reference is not an admission that it is prior art to the present invention, especially any reference that may have a publication date after the priority date of this application. The disclosures of all patents, patent applications, and publications cited herein are hereby incorporated herein by reference in their entirety, to the extent that they provide exemplary, procedural, or other details supplementary to those set forth herein.

What is claimed is:

1. A system for non-invasively detecting a change in well integrity, the system comprising:
    a seismic sensor disposed proximate to a wellhead of a wellbore, the seismic sensor configured to record a plurality of measured seismic signals from the wellbore, the plurality of measured seismic signals including acoustic measurements of the well; and
    a computer system coupled to the seismic sensor and configured to detect a change in well integrity as determined from the plurality of seismic signals, wherein the computer system is configured to:
        receive the measured seismic signals including the acoustic measurements of the well;
        compare the acoustic measurements of the well to known acoustic measurements from an undamaged well including a bottom well reflection signal; and
        based on at least one of (a) noise in the acoustic measurements at least partially obscuring the bottom well reflection signal, or (b) increased low frequency ambient noise in the acoustic measurements, identifying a change in well integrity.

2. The system of claim 1 further comprising a seismic source for producing a seismic signal from the wellbore.

3. The system of claim 2 wherein the seismic source comprises an impulsive or a continuous seismic source.

4. The system of claim 1 wherein the seismic sensor continuously records background seismic signals which are passively emitted from the wellbore.

5. The system of claim 1 wherein the seismic sensor comprises a hydrophone, a geophone, a fiber optic sensor, an ocean bottom sensor or an ocean bottom node.

6. The system of claim 1 wherein the wellhead is an onshore wellhead or an offshore wellhead.

7. The system of claim 1 wherein the computer system comprises:
    an interface for receiving the measured seismic signals;
    a memory resource;
    input and output functions for presenting and receiving communication signals to and from a human user;
    one or more central processing units for executing program instructions; and program memory, coupled to the central processing unit, for storing a computer program including program instructions that, when executed by the one or more central processing units, cause the computer system to perform a plurality of operations for detecting well integrity failure.

8. The system of claim 7 wherein the plurality of operations comprises comparing the acoustic measurements of the well to known acoustic measurements from the undamaged well including the bottom well reflection signal.

* * * * *